(No Model.)
J. F. MARTIN.
CONDUIT FOR ELECTRIC CONDUCTORS.
No. 286,945. Patented Oct. 16, 1883.
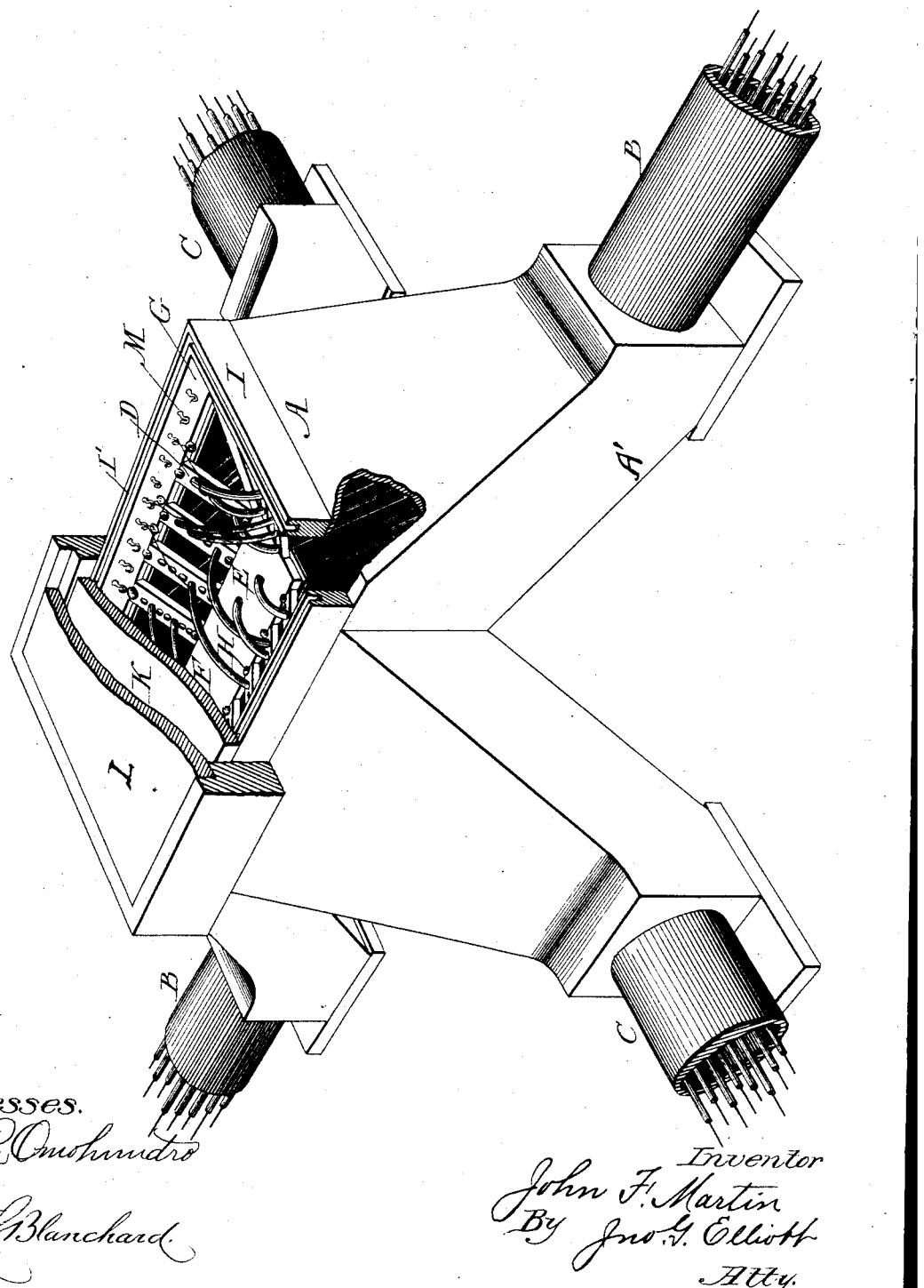

UNITED STATES PATENT OFFICE.

JOHN F. MARTIN, OF CHICAGO, ILLINOIS.

CONDUIT FOR ELECTRIC CONDUCTORS.

SPECIFICATION forming part of Letters Patent No. 286,945, dated October 16, 1883.

Application filed March 12, 1883. (No model.)

*To all whom it may concern:*

Be it known that I, JOHN F. MARTIN, a citizen of the United States, residing in Chicago, county of Cook, and State of Illinois, have invented certain new and useful Improvements in Conduits for Electric Conductors, of which the following is a specification.

This invention relates to underground conduits for electric conductors in which drawing-in boxes are provided at intervals along the conduit, for allowing access to be had to the interior thereof for the purpose of laying, taking out, or inspecting the wires.

The object of my invention is to provide at any desired point or points along the conduit a simple and readily-accessible drawing-in box, connected with the main and branch pipes, where the latter occur, and provided with adjustable supports for the wires and their tubular insulators, whereby the insulated wires can be conveniently carried through and distributed within the box, and also effectively supported and separated from each other. To such end I construct the box with legs which are connected with the pipe-sections, whereby the tubular insulators and wires can be carried through the box from and to the conduit-pipes, and within the box I provide adjustable perforated supports for the tubular insulators. These supports can be shifted, so as to allow room for the arm of an operator to be passed down into the box for the purpose of drawing the wires from one pipe to another, coupling together the tubular insulators, and passing the tubular insulating-couplings through the perforations in the supports, after which the latter can be adjusted at required distances apart and locked in their appropriate positions.

In the annexed drawing, which represents in perspective a box constructed in accordance with my invention, and provided with adjustable supports, A indicates the box, which is formed with inclined hollow legs A', two or more in number, according to the number of pipe-sections with which the box is to be connected. In the present illustration the box has four legs, two of which connect with the pipe-sections B of a main conduit-pipe, while the two remaining legs are connected with branch pipes C, which latter, for example, will run under a cross-street. Each pipe-section terminates at the lower end of a leg, and can be provided at or near its junction with the latter with any one of the several forms of insulating disks or supports for the tubular insulators shown in separate applications which I have made for Letters Patent of the United States. The legs of this box rise from their points of connection with the pipes to an extent sufficient to admit of the top of the box being supported substantially flush with the surface of the earth, so that while the pipes can be laid at a suitable depth underground, the box shall be at all times readily accessible. The legs are made larger in section at their upper than at their lower ends, so that the areas of the passages respectively formed through the same are enlarged at the points where they open into the box. By means of this construction the insulated wires from the pipes can be spread farther apart as they enter the box, and hence confusion among the wires avoided, and a sufficient separation of the latter within the box attained to render the wires easily distinguishable.

D indicates the adjustable supports for the insulated wires. These supports consist of bars, slats, or blocks, which are made of wood, paper, or some other suitable non-conducting material or materials, and provided with perforations $d$, through which the insulating-tubes E for the wires pass. The lower ends of the supports are upheld by means of a frame or support, F, which is held in any suitable way within the box—as, for example, by means of vertical or horizontal braces, or by connecting the frame directly with the walls of the structure. The upper ends of the perforated supports D rest upon a horizontal ledge, G, which extends along the inner walls of the box, near the top of the latter.

The support or frame F is located centrally within the box and below the level of the ledge G, so that sufficient space shall be left between the two for the insulated wires, which are passed through the perforated supports in the manner shown. The supports for the insulated wires can be secured in place by various means—as, for example, by set-screws H, which pass through the supports and are screwed into the devices upon which the supports rest. It will be evident, however, that notches or recesses could be formed in the rests F and G for the inclined supports, or that other analogous means could be employed for locking the latter in place. It will be seen that the inclined supports are arranged in sets or series, and that the insulated wires, which enter the box from one leg, are carried through one set of supports, and thence distributed and passed to one or more of the other sets of supports, from which latter they are carried down through one or more of the remaining legs.

The tubular insulator supported within the conduit-pipes can be made rigid or inflexible; but in order to admit of the wires being bent in their passage through the box, it is necessary to provide flexible tubes, which can be coupled with the tubes that are inclosed by the conduit-pipes. When, therefore, it becomes necessary to draw the wires through the box, and to connect any of these flexible coupling-tubes with the tubes in the main pipes at or near the junction of the latter with the legs of the box, the perforated supports can be shifted to one side, so as to allow the operator to reach down through the box to the lower portions of the passages in its legs. The connections can thus be readily made, and the tubular couplings then passed through the perforated supports, and the latter again adjusted and locked in their proper positions. It will be evident that the perforated supports could be held in a horizontal plane or planes within the box; but by arranging the rests for these supports, as shown, so as to incline the latter, the supports can be made longer, and hence a greater number of perforations be provided without materially weakening the supports.

I indicates the rectangular frame, which can be formed with or seated upon the box, so as to form the top edge thereof. This frame is provided with a groove, I', in which a tongue upon the under side of a covering-board, K, is received, so as to tightly close the box and prevent the entrance of dirt or water. I also provide an outer heavier cover, L, which fits both over the frame and the inner cover, whereby the latter is protected. This outer cover can be flush with or a little above or below the surface of the ground, and, if desired, can have a ring or handle for raising it, and also a lock for preventing unauthorized persons from having access to the interior of the box.

The legs can have base-boards at their lower ends, in order to better support the structure in place and prevent any one side of the box from sagging or sinking.

The wires can be designated by numbers, and to such end I propose attaching numbered tags to cords or wires connected with the tubes within the box, and suspended from hooks M or otherwise convenient supports.

Having thus described my invention, what I claim, and desire to secure by Letters Patent, is—

1. A drawing-in box for insulated electric conductors, provided with a suitable cover, and having hollow legs, which are connected with the ends of the sections of a conduit pipe or pipes, substantially as described.

2. The perforated supports for insulated electric conductors fitted within a drawing-in box, and means providing for a lateral adjustment of said supports relative to each other, substantially as described.

3. The combination, with the drawing-in box having hollow legs connected with sections of a conduit-pipe, of the perforated supports for the insulated conductors adjustably secured within the box, substantially as described.

4. The combination of the drawing-in box having a centrally-located rest, and a rest located along its inner walls, of the perforated supports for the insulated conductors adjustably secured upon said rests, substantially as described.

5. The combination of the drawing-in box having an upper horizontal ledge along its inner walls, and a lower rest, also supported within the box, of the inclined supports for the insulated conductors adjustably held upon said rests, substantially as and for the purpose described.

6. The drawing-in box provided with hollow legs, a double cover, and internal supports for the insulated wires, substantially as described.

JOHN F. MARTIN.

Witnesses:
 JNO. G. ELLIOTT,
 W. W. ELLIOTT.